Figure 3:
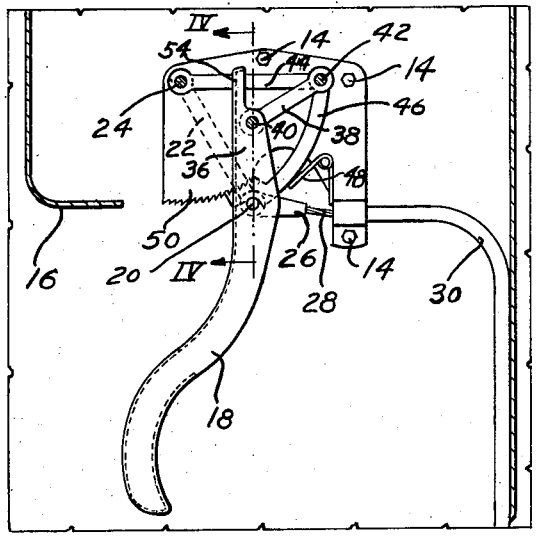

Aug. 8, 1950  J. HALTENBERGER  2,518,234
BRAKE LEVER
Filed April 8, 1946  2 Sheets-Sheet 1

Inventor
JULES HALTENBERGER
Beaman & Langford
Attorney

Aug. 8, 1950     J. HALTENBERGER     2,518,234
BRAKE LEVER
Filed April 8, 1946     2 Sheets-Sheet 2
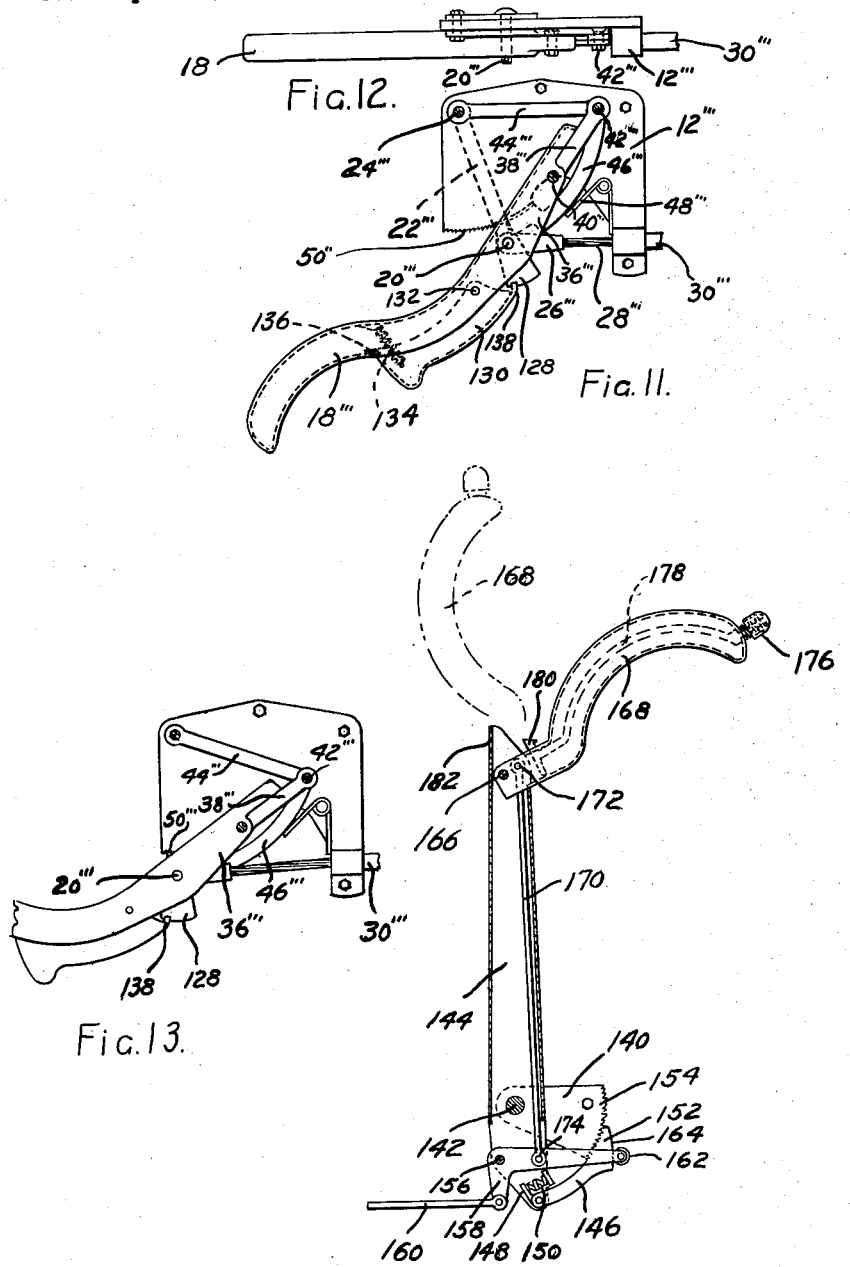
INVENTOR.
JULES HALTENBERGER
BY Beaman + Langford Patented Aug. 8, 1950

2,518,234

UNITED STATES PATENT OFFICE 2,518,234

BRAKE LEVER

Jules Haltenberger, La Jolla, Calif.

Application April 8, 1946, Serial No. 660,480

4 Claims. (Cl. 74—518)

The present invention relates to improvements in automotive parking brake mechanism.

Parking brakes at the present time are of two classes. Either they apply to the rear wheels by manipulating the brake shoes normally actuated by the hydraulic brakes or to a separate hand brake on the transmission having no other function.

It is generally conceded that parking brakes that have heretofore been used upon passenger automobiles, especially, are difficult to apply so as to be able to hold the automobile on a steep grade. Also, such brakes have not been equipped with adequate adjustment to compensate for wear of brake lining or block or cable stretch. In trucks and busses, in order to compensate for wear and stretch, the hand parking brake is provided with an extremely long swing which places the hand lever out of the convenient reach of the driver. Moreover, the design of practically all hand and parking brakes is such that as the resistance of the brakes increases the mechanical advantage of the brake lever decreases.

According to the present invention, the abovementioned deficiencies in present design have been substantially overcome by (a) providing a self-adjustment for wear and cable stretch, (b) reducing the length of the brake applying movement of the brake lever, and (c) either increasing the mechanical advantage as the brake resistance increases or by compensating for wear and stretch yet permitting the brake lever to swing through an arc during brake application, which is most advantageous to the operator.

Thus, one of the objects of the invention is to provide a hand or parking brake lever having an adjustable operating fulcrum.

Another object is to provide a brake lever having a toggle link with an adjustable operating fulcrum.

Another object is to provide a brake of the type described in which the slack in the brake mechanism is taken up by a self adjustment.

Another object of the invention resides in a lever type of hand brake in which the slack in the mechanism is taken up with lesser mechanical advantages and the brake is applied with a greater mechanical advantage.

A further object of the invention is to provide a hand brake in which the mechanical advantage increases with the increase in brake resistance.

A still further object of the invention is to provide a ratchet hand brake having a toggle link with an adjustable fulcrum with a safety catch for holding the brake applied.

A still further object is to provide a hand brake in which the slack is taken up through a pawl and ratchet arrangement and the brake is applied thereafter with an increased mechanical advantage.

A further object is to provide a hand brake in which the safety latch may be released to release the brake without first increasing the braking pressure as in the case of the conventional ratchet brake lever.

A further object is to provide a hand brake which can be set by a foot pedal.

A still further object is to provide a hand brake which can be released by a foot pedal.

A still further object is to provide a brake lever having an over center release with maximum mechanical advantage at the time of maximum brake resistance.

These and other objects, advantages and improvements, residing in the design, arrangement and construction of the component parts of the brake lever structure will more fully appear and be appreciated from a consideration of the following specification and the appended claims.

Figure 1:
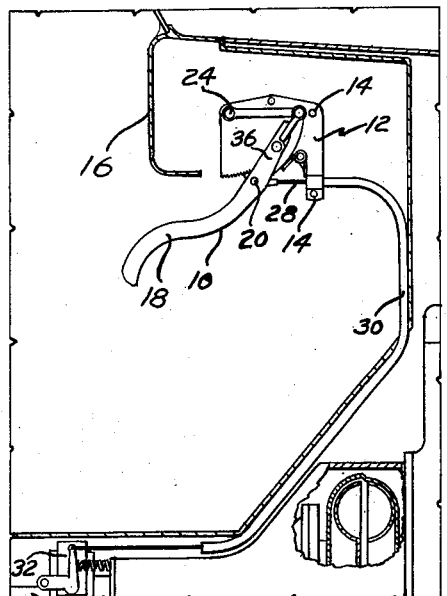
Figures 2, 4, 5:
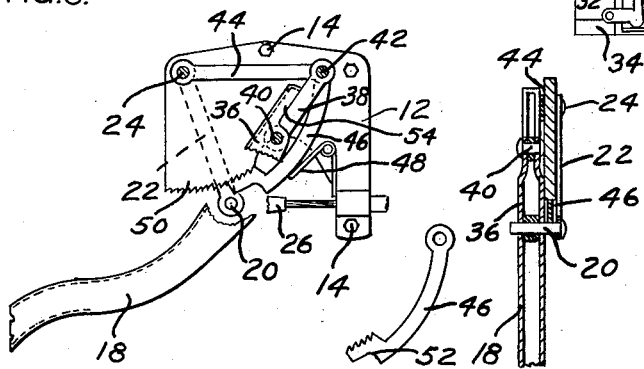
Figure 7:
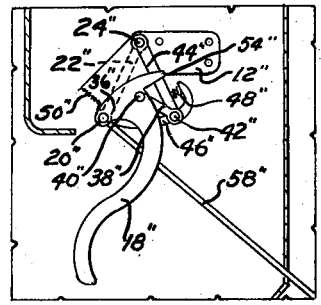
Figure 10:
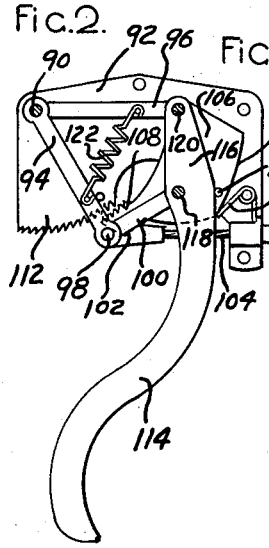
Figures 8, 9:
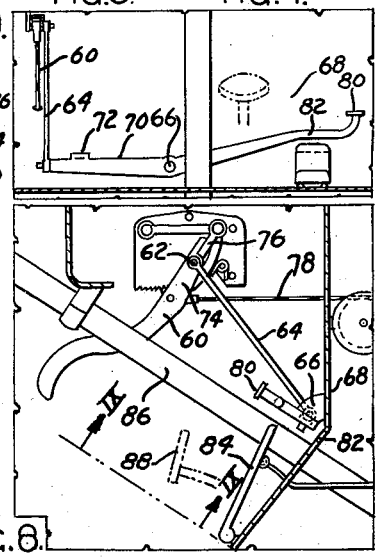
Figure 6:
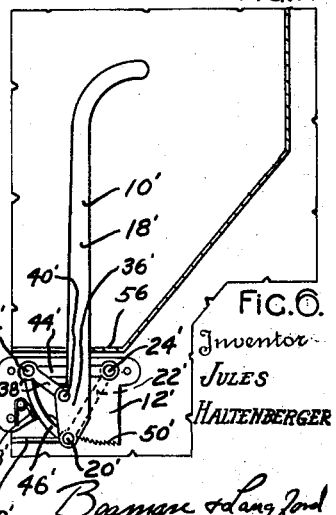

In the drawings,

Fig. 1 is a longitudinal section of the fore part of an automobile driving compartment showing a depending parking brake lever in a tightened position, Fig. 2 is an enlarged view of the brake lever system shown in Fig. 1 with parts broken away, Fig. 3 illustrates the released position of the brake lever shown in Fig. 2, Fig. 4 is a section substantially on line IV—IV of Fig. 3, Fig. 5 illustrates a detailed part shown in Figs. 1 to 4, inclusive, Fig. 6 illustrates the invention applied to a floor type parking brake lever, Fig. 7 shows the invention applied with a depending parking brake lever having a push-pull rod connection, Fig. 8 illustrates a foot pedal operation of the depending hand brake lever, Fig. 9 is an elevation viewed in the plane of IX—IX of Fig. 8, Fig. 10 is a modification of the invention illustrated in Figs. 1 to 7, inclusive, Fig. 11 is a duplication of the invention illustrated in Fig. 2, here provided with a safety lock, Fig. 12 is a plan view of the invention shown in Fig. 11, Fig. 13 shows the brake lever position shown in Fig. 11 after wearing of the brake, and Fig. 14 is a modification of the invention.

Referring to Figs. 1 to 5, inclusive, the hand or parking brake 10 is mounted on the plate 12 by suitably attaching by cap screws 14 at a point behind the instrument panel 16, to the left of the steering column, in the usual manner. The hand lever 18 is pivoted intermediate its ends on a fulcrum pin 20 carried on arm 22 located on the back side of the plate 12 and pivoted from the fixed pin 24 mounted in the plate 12. The pin 20 also functions as a point of attachment for the anchor end 26 of the flexible cable 28 which extends through the rigid tube 30 to the band brake 32 on the transmission 34.

The upper portion 36 of the lever 18 forms a toggle with the link 38 having a pivotal connection at 40 with the portion 36 and a similar connection with the pin 42 carried in the arm 44 which in turn has a pivotal connection with the pin 24. Also, pivoted on the pin 42 is a pawl 46 urged by a spring 48 into engagement with a toothed segment 50 integral with the plate 12. As more clearly shown in Fig. 5, the pawl 46 has a notch 52 to provide clearance for the pin 20. With the lever 18 in the brake release position of Fig. 3, the pin 20 is in the notch 52 and prevents the pawl 46 from movement relative to the segment 50. However, with the brake applied as shown in Fig. 2 with the toggle linkage 36 and 38 extended, the pin 20 is clear of the notch 52 and the pawl 46 may be moved clockwise over the segment 50, the slant of the teeth of the segment 50 and pawl 46 being so arranged as to permit clockwise movement but interlocking with each other on counter-clockwise movement of the pawl 46.

As will be readily understood, when the toggle linkage 36 and 38 is extended by the operator pulling the lever 18 into the position shown in Fig. 2, the cable 26 is tensioned to apply the brake 32. A stop 54 constituted by an extension of the portion 36 engages with the link 38 to limit clockwise movement of the pin 40 slightly over center so that the tension on the cable 26 will hold the lever 18 in a brake applying position.

With the brake 10 in the position shown in Fig. 2, the parts 22, 36, 38 and 44 define a rigid triangular frame having the pin 24 as its fulcrum. If a clockwise force is now applied to the lever 18, this frame will pivot about the pin 24, the cable 26 will be further tensioned, and the pawl 46 will be moved clockwise along the segment 50 into a new position. In this new position the fulcrum 20 of the toggle linkage 36 and 38 has been moved in a direction taking up extra slack in the cable 26 and brake 32 when in the released position of Fig. 3. Thereafter for a considerable length of service merely the extension of the toggle linkage 36 and 38 will be sufficient to fully apply the brake 32. Should further slack develop in the cable 26 because of brake wear or cable stretch, the pawl 46 will self adjust itself along the segment 50 each time it is necessary to apply an extra pull upon the lever 18 in order to fully set the brake 32.

In Fig. 6, the principle of operation and construction of the form shown in Figs. 1 to 5 is shown adapted to a floor type of hand or parking brake. The brake 10' is mounted below floor 56 on a suitable plate 12'. The arms 22' and 44' are pivoted at one end to the fixed pin 24'. The lever 18' has a pivotal connection with the arm 22' through the pin 20' to which the cable or rod 28' is also attached. The pawl 46 corresponds in construction and function to the pawl 46 and coacts with the toothed segment 50' under the stress of the spring 48'. The end portion 36' of the lever 18' forms a toggle linkage with the link 38' which has pivot connections at one end with the pin 40' and at the opposite end with the pin 42'. In general, the parts in Fig. 6 identified by prime reference characters compare in construction and function to parts in the form of Figs. 1 to 5, inclusive, identified by similar unprimed reference characters.

In the floor type brake lever shown in Fig. 6, the fixed fulcrum for the frame defined by the parts 22', 36', 38 and 44' with the toggle extended is the pin 24'. The adjustable fulcrum under the control of the pawl 46' is the pin 42'. The manner in which the pawl 46' functions to takeup the slack due to wear and stretch is the same as the pawl 46.

Referring to Fig. 7, the principle of construction of the forms of Figs. 1 to 5, inclusive, is shown adapted to a parking brake in which an inclined rod 58'' is employed to actuate the brake. Plate 12'' supports the fixed pivot pin 24'' to which the arms 22'' and 44'' are pivoted. The pawl 46'' is urged by a spring 48'' into engagement with the toothed segment 50'' in the same manner as the pawl 46 and 46'. The lever 18'' has a portion 36'' which forms a toggle linkage with the link 38''. A pin 20'' has a pivotal connection with the parts 22'', 36'' and 58. The link 38'' has pivotal connections with the pins 40'' and 42''. The adjustable fulcrum for the toggle linkage 36'' and 38'' is the pin 42''. The adjustment for slack due to wear and stretch is the same as described with reference to Figs. 1 to 5, inclusive. Projection 54'' limits the slightly over center position of the toggle linkage when extended. As in the case of the form shown in Fig. 6, the parts identified by double-primed reference characters correspond in construction and function to the parts identified by similar unprimed reference characters in Figs. 1 to 5, inclusive.

An arrangement for foot application and release of the parking or hand brake is shown in Figs. 8 and 9. The brake 60 may be identical with that shown in Figs. 1 to 5, inclusive with the exception that the pin 62 corresponding to the pin 40 of the toggle linkage is extended to receive the rod 64. Supported on a pivot 66 mounted on the dash 68 is a rocker member 70 to which the rod 64 is attached at one end. Downward movement on the foot pad 72 will act to pull down on the rod 64 to extend the toggle linkage 74 and 76 to apply the parking brake through the cable 78. To release the brake 60, a downward movement is exerted against the foot pad 80 at the opposite end of the member 70. A portion 82 may be provided on the member 70 to be engaged by the toe of the operator's shoe at the time the accelerator 84 is depressed. This arrangement is convenient for releasing the parking brake on a steep grade. The steering column is located at 86 and a conventional foot brake pedal location at 88.

Fig. 10 shows a slightly different arrangement in which the slack is taken up before the toggle is extended. In each of the forms heretofore described, the slack is taken up after the toggle is extended. As illustrated, a fixed pivot pin 90 is mounted on the plate 92 from which the arms 94 and 96 are pivotally supported. The pivot pin 98 connects the toggle link 100 to the arm 94 at a point of connection for the anchor 102 of the cable 104. The pawl plate 106 has a toothed part 108 which is urged by a spring 110 toward the toothed segment 112. The hand lever 114 has a toggle portion 116 to which the link 100 is pivotally connected through the pin 118 and the arm 96 is similarly connected through the pin 120.

A relatively strong spring 122 is connected between the arms 94 and 96 to continue to urge the same together and collapse the toggle linkage into the position shown in Fig. 10. A pin 124 carried on the pawl 106 is engaged by the lever 114 to hold the toothed portion 108 out of engagement of the segment 112 under the action of the spring 122. Pawl plate 106 has an arcuate edge 126 along which the spring 110 acts to urge the plate 106 clockwise when the lever 114 is pivoted around the adjustable fulcrum 120 to extend the toggle linkage 100 and 116.

To describe the operation of the form of Fig. 10, initial brake applying movement on the lever 114 results in pivotal movement around the pin 90 with the parts remaining in the relative position shown in Fig. 10 until the resistance of the cable 104 overcomes the tension of the spring 122. Such movement results in the pawl 106 being moved clockwise to an advanced position opposite the segment 112. With slack taken up in the cable 104, the toggle linkage 100 and 116 starts to extend, overcoming the tension of the spring 122. This results in the pawl 106 interlocking with the segment 112 and the pin 120 becomes fixed in the position of slack adjustment. Thus the pin 120 becomes the fixed fulcrum for the toggle linkage 100 and 116 to fully apply the brakes when the toggle is fully extended. When the brakes are released, the action of the spring 122 and the tension of the cable 104 results in the parts being returned to the position shown in Fig. 10.

In Figs. 11 to 13, inclusive, is shown a construction substantially identical to that shown in Figs. 1 to 5, inclusive, except for the provision of a safety latch to prevent the toggle linkage from being accidentally collapsed. The plate 12''' carries a fixed pivot pin 24''' with which the arms 44''' and 22''' have pivotal connections. A pin 20''' in the lever 18''' has a pivotal connection with the arm 22''' and a connection with the anchor 26''' of the cable 28'''. A toggle link 38''' is pivotally connected to the arm 44''' and lever 18''' through pin 40''' and 42'''. The pawl 46''' is pivoted on the pin 42''' and is urged into engagement with the segment 50''' by spring 48'''. The construction and function of the structure just described is the same as that shown in Figs. 1 to 5, inclusive.

The safety latch for the lever 18''' in brake applying position comprises an extension 128 on the arm 22''' having a notch with which the latch 130 engages. The latch 130 is mounted for pivotal movement about the pin 132 with a spring 134 urging the latch 130 counterclockwise against the stop 136 to limit its outward movement. When the latch is squeezed inwardly the tooth 138 clears the extension 128 and the toggle linkage 36''' and 38''' may be collapsed to release the brake. As long as the tooth 138 engages the notch of the extension 128 the lever 18''' cannot be accidentally actuated to release the brake.

In Fig. 13, the form illustrated in Fig. 12 is shown in a position of self-adjustment after a long period of service resulting in substantial brake block wear and cable stretch. It will be noted that the arm 44''' of Fig. 11 has moved from a horizontal position clockwise through a substantial arc, thus illustrating the adjustment of the position of the fulcrum pin 42''' of the toggle linkage 36''' and 38''' to a point compensating for wear and slack at which the brake may be fully applied by extending the toggle with a mechanical advantage increasing with the increase in brake resistance. Also to be noted is the advancement of the pawl 46''' along the segment 50''' when Fig. 13 is compared to Fig. 11. The adjustment just described does not affect the relationship between the latch 130 and the notched extension 128.

Referring to Fig. 14, this is an arrangement particularly designed for trucks and busses and characterized by the fact that the operating lever is within easy reach yet adequate provisions are made for wear and stretch of the associated parts. As shown, the plate 140 is fixed and carries a pin 142 upon which the wear adjustment lever 144 is pivoted. Pivoted on the lower end of lever 144 is a pawl 146 having a projection 148 against which the spring 150 acts to urge the toothed portion 152 into engagement with the toothed segment 154. Also pivoted on the lever 144, at 156, is a bell crank lever 158 having one arm connected to the brake rod 160. At the end of the other arm is a roller 162 adapted to roll along the arcuate edge 164 of the pawl 146. Pivoted at 166 to the upper end of the lever 144 is a hand lever 168. The draw rod 170 is connected at its upper end to the pin 172 and at its lower end to the pin 174. A release button 176 acting through the push rod 178 depresses the latch 180 to release it from the opening 182 with the hand lever 168 in the position shown in dotted outline and the brakes fully applied.

When the hand lever 168 is in the position shown in dotted outline, the roller 162 will have advanced beyond the edge 164 and any counterclockwise movement of the lever 144 through the lever 168 will result in the pawl 146 being advanced along the segment 154 to adjust the fulcrum point 156 in a direction to compensate for wear or slack. Except for occasional movement of the lever 144 to take care of wear and slack, the brakes are applied solely by movement of the hand lever 168 from the full-line to the dotted line positions shown in Fig. 14.

Having thus described my invention, what I claim as new and desire to be covered by Letters Patent is:

1. In an automotive vehicle, a hand brake mechanism comprising a mounting structure, a hand lever, a pivotal arm having a pivotal connection at one end in said mounting structure, a pivotal connection between the other end of said arm and a point upon said lever intermediate its ends, a second pivotal arm having a pivotal connection at one end to said mounting structure, a toggle link having a pivotal connection with said lever outwardly from said point at one end, said link at the other end having a pivotal connection with the other end of said second arm to provide a fulcrum for the toggle joint formed by said link and that portion of said lever outwardly from said point, a rack fixed with respect to said mounting structure, a pawl mounted on said second arm and adapted to engage with said rack upon pivotal movement of said second arm to hold said fulcrum in different positions of adjustment along the arc of movement of said second arm, said toggle joint upon being extended acting to swing said first arm about its pivot, and brake applying means operatively connected to said lever to be actuated by said lever upon pivotal movement of said first arm upon extension of said toggle joint with said fulcrum held against movement by said pawl in a brake releasing direction.

2. In an automotive vehicle, a hand brake mechanism comprising a mounting structure, a swinging arm carried upon said structure, a hand lever, a pivotal connection between said arm and a point upon said lever intermediate its ends, brake applying means operatively connected to said arm and adapted to be moved in a brake applying direction upon swinging movement of said arm, a second swinging arm carried upon said structure, a link having pivotal connections at its ends with said second swinging arm and said lever to form a toggle joint with said first pivotal connection, the pivotal connection between said link and said second swinging arm constituting a fulcrum for the toggle joint, a rack upon said mounting structure, a pawl spring urged into engagement with said rack and connected to said second swinging arm to lock the same against movement in one direction while permitting movement in the opposite direction, whereby pivotal movement of said lever to apply the brakes around said first pivotal connection extends said toggle joint to move said first swinging arm in a brake applying direction with said pawl locking said second swinging arm to locate the position of said fulcrum.

3. In an automotive vehicle, a hand brake mechanism comprising a mounting structure, a hand lever movable in one direction to apply the brakes and in the opposite direction to release the brakes, a movable support for said lever carried upon said structure including pivotal connection between said support and said lever, said lever having an extension to the side of said connection removed from the gripped portion of said lever and constituting one link of a toggle joint, a second link of said joint pivotally connected at one end to said extension, a second movable support carried from said structure, a pivotal connection between said second support and the other end of said second link to provide the fulcrum of said joint, a locking means associated with said fulcrum and engaged with said structure to hold said fulcrum against movement in the direction of thrust resulting from the extension of said joint while permitting movement in the opposite direction to shift the location of said fulcrum, brake applying means operatively connected to said lever and said first support to apply the brakes upon extension of said toggle joint to impart movement to said first support resulting from pivotal movement of said lever and accompanied by movement due to extension of said joint.

4. In an automotive vehicle, a hand brake mechanism as defined in claim 3 wherein said supports are constructed and arranged for movement as a unit with said toggle extended to advance the position of engagement of said locking means with said structure to move said fulcrum in a direction to apply the brakes.

JULES HALTENBERGER.

REFERENCES CITED

The following references are of record in the file of this patent:

UNITED STATES PATENTS

| Number | Name | Date |
| --- | --- | --- |
| 1,371,655 | Watson | Mar. 15, 1921 |
| 1,576,717 | Catenaro | Mar. 16, 1926 |
| 2,085,427 | Elliott | June 29, 1937 |
| 2,190,972 | Boldt | Feb. 20, 1940 |
| 2,240,783 | Jandus | May 6, 1941 |
| 2,287,039 | Jandus | June 23, 1942 |
| 2,382,192 | White | Aug. 14, 1945 |
| 2,421,402 | Benning | June 3, 1947 |